United States Patent [19]

Michel

[11] Patent Number: 4,811,308

[45] Date of Patent: Mar. 7, 1989

[54] SEISMO-ACOUSTIC DETECTION, IDENTIFICATION, AND TRACKING OF STEALTH AIRCRAFT

[76] Inventor: Howard E. Michel, 49 Beverlee Rd., Tyngsboro, Mass. 01879

[21] Appl. No.: 924,707

[22] Filed: Oct. 29, 1986

[51] Int. Cl.$^4$ .............................................. G01S 3/80
[52] U.S. Cl. .................................. 367/136; 367/124; 367/129; 367/118; 367/906; 340/541; 102/211
[58] Field of Search ............... 367/135, 136, 124, 129, 367/118, 93; 340/565, 566, 541, 522; 102/211, 427, 419; 181/122

[56] References Cited

U.S. PATENT DOCUMENTS

| | | | |
|---|---|---|---|
| 3,774,190 | 11/1973 | Kyle, Jr. ........................ | 340/258 R |
| 3,824,532 | 7/1974 | Vandierendonck ................. | 340/15 |
| 3,852,706 | 12/1974 | Barney et al. ..................... | 340/6 R |
| 3,995,223 | 11/1976 | Gimber et al. ..................... | 181/122 |
| 4,041,442 | 8/1977 | Marquardt ....................... | 367/129 |
| 4,083,031 | 4/1978 | Pharo, Jr. ......................... | 340/5 R |
| 4,208,735 | 6/1980 | Suzuki et al. ..................... | 367/136 |
| 4,322,828 | 3/1982 | Hoff et al. ......................... | 367/124 |
| 4,408,533 | 10/1983 | Owen et al. ....................... | 367/136 |
| 4,409,899 | 10/1983 | Owen et al. ....................... | 367/136 |
| 4,558,439 | 12/1985 | Gudesen ........................... | 367/127 |
| 4,630,246 | 12/1986 | Fogler ............................... | 367/135 |

OTHER PUBLICATIONS

"The AFGL Vibro-Acoustic Measurement System", Howard E. Michel, AIAA Shuttle Environment and Operations II Conference, A Collection of Technical Papers, Houston, Texas, Nov. 13–15, 1985.

Primary Examiner—Thomas H. Tarcza
Assistant Examiner—Daniel T. Pihulic
Attorney, Agent, or Firm—William G. Auton; Donald J. Singer

[57] ABSTRACT

An aircraft detection system which detects and tracks aircraft using: arrays of seismic and acoustic sensors, a set of junction circuits, a set of subarray circuits, several slave computers, and a master computer. Each junction circuit relays detected signals from several adjacent sensors to a subarray circuit and command signals to each of the sensors to adjust the gain of their output signals. Each subarray circuit receives and unites the outputs of several adjacent junction circuits into a subarray which has a particular geographical location in the array of sensors. Each slave computer forwards detected signals from single subarray circuit to the master computer, and relays command signals back to each individual sensor. Each subarray is able to track the seismic or acoustic signature of an aircraft as it travels across the regular distribution of sensors. Each subarray is thereby able to define an azimuth to the target aircraft. Collectively the information from several subarrays yields several azimuths from which the position of the aircraft may be located by triangulation of the azimuths.

8 Claims, 5 Drawing Sheets

SEISMO-ACOUSTIC DETECTION, IDENTIFICATION, AND TRACKING OF STEALTH AIRCRAFT

STATEMENT OF GOVERNMENT INTEREST

The invention described herein may be manufactured and used by or for the Government for governmental purposes without the payment of any royalty thereon.

CROSS-REFERENCE TO RELATED APPLICATIONS

The subject matter of this application is related to the subject matter contained in U.S. application Ser. No. 623,586 now U.S. Pat. 4,630,246, filed 22 June 1984, entitled "Seismic-Acoustic Low-Flying Aircraft Detector" by Robert J. Fogler.

BACKGROUND OF THE INVENTION

The present invention relates generally to aircraft detection systems, and more specifically to a system for detecting and tracking stealth aircraft using microcomputer-controlled adaptive arrays of seismic and acoustic sensors.

Conventional radio frequency (R.F.) radar systems possess certain natural limitations in the detection of low-flying aircraft. Terrain echo returns have increasingly greater tendencies to obscure tracking of aircraft as they approach the ground. Certain aircraft will intentionally take advantage of this limitation and fly low to avoid the radar of law enforcement agencies, border patrol officials, and military facility protection systems. With the advent of advanced weapons and aircraft technology, such as cruise missiles, stealth technology and ground-hugging guidance systems, radar has become a less reliable means for the detection of hostile aircraft penetration. The small radar cross sections of stealth aircraft and cruise missiles make them difficult targets under ideal conditions. With the addition of ground-hugging guidance systems, radar detection probabilities are further reduced as the target is concealed by ground clutter and topographic effects. Further, active sensors, such as radar, can be targeted and neutralized on the basis of their own signal.

Aircraft which are equipped with stealth anti-detection devices present an additional challenge, since they possess radar jamming systems which render them invisible to R.F. radar systems.

The task of providing a means of detecting stealth aircraft is alleviated, to some extent, by the systems of the following U.S. Patents, the disclosures of which are incorporated by reference:

U.S. Pat. No. 4,630,246 issued to R. J. Fogler;
U.S. Pat. No. 4,208,735 issued to Suzuki et al,
U.S. Pat. No. 3,824,532 issued to Vandierendonck;
U.S. Pat. No. 3,774,190 issued to Kyle, Jr.;
U.S. Pat. No. 3,852,706 issued to Barney et al; and
U.S. Pat. No. 4,083,031 issued to Pharo, Jr.

Stealth aircraft may be invisible to radar, but they are still subject to detection from their seismic and acoustic signatures. The Fogler reference is a detection system which uses a geophone and a microphone to detect low-flying aircraft.

The Suzuki et al patent discloses a moving sound source identifying system which uses a pair of spaced apart microphones and output circuitry which calculates the correlation function between signals produced by the two microphones. The system is said to differentiate between moving and stationary sources as well as flying and ground sources.

The Vandierendonck patent discloses a seismic signal intrusion detection classification system which detects a sound source, processes the sound and examines the characteristic pattern of the sound to provide classification thereof.

The Kyle, Jr. patent discloses an intrusion detection system which detects the sound source and processes the output signal through a signal processor. The source is identified from the vibrational signature of the process signal.

The Barney et al and Pharo, Jr. patents object locating systems which use a pair of hydrophones which detect acoustical signals, one of the signals being compared with the other after being delayed in time.

The references cited above have an advantage in that they do not rely on transmitted RF radar signals. Collectively, these references represent a recognition of the need to develop seismic and acoustic detection systems which are not dependent upon transmitted RF signals which can be jammed. The present invention is intended to help satisfy that need.

SUMMARY OF THE INVENTION

The present invention is an aircraft detection system which detects stealth aircraft using: arrays of seismic sensors, arrays of acoustic sensors, a set of junction circuits, a set of subarray circuits, several slave computers, a master computer, and a central data computer. Multiple seismic sensors are used to detect aircraft by their seismic signatures. These seismic signatures are weaker than the acoustic signatures of aircraft, but the seismic signatures generally arrive first.

Each junction circuit electrically connects multiple sensors into an array and outputs a detection signal when the sensors detect an aircraft signature signal. Each array has either just seismic sensors or just acoustic sensors which are distributed geographically.

Each slave computer receives and relays detection signals from one or more subarrays to the master computer. Each slave computer also relays command signals from the master network back to the subarrays. These command signals can include an instruction to increase the gain of a channel.

The master computer is used to control the system and provides access to the system by the operators. The master computer also receives and relays seismic and acoustic data to the central data computer for near real-time data analysis.

It is an object of the present invention to detect stealth aircraft by their seismic and acoustic signatures.

It is another object to detect stealth aircraft with a passive system without transmitting radio frequency radar signals.

It is another object to track low-flying aircraft using arrays of seismic and acoustic sensors.

It is another object to identify aircraft by the characteristics of their seismic and acoustic signatures. Identification is done by analysis of acoustic and seismic signals, i.e., Fourier transform power spectral sensing, etc.

These, together with other objects, features and advantages of the invention, will become more readily apparent from the following detailed description when taken in conjunction with the accompanying drawing wherein like elements are given like reference numerals throughout.

DETAILED DESCRIPTION OF THE PREFERRED EMBODIMENT

Figure 1:
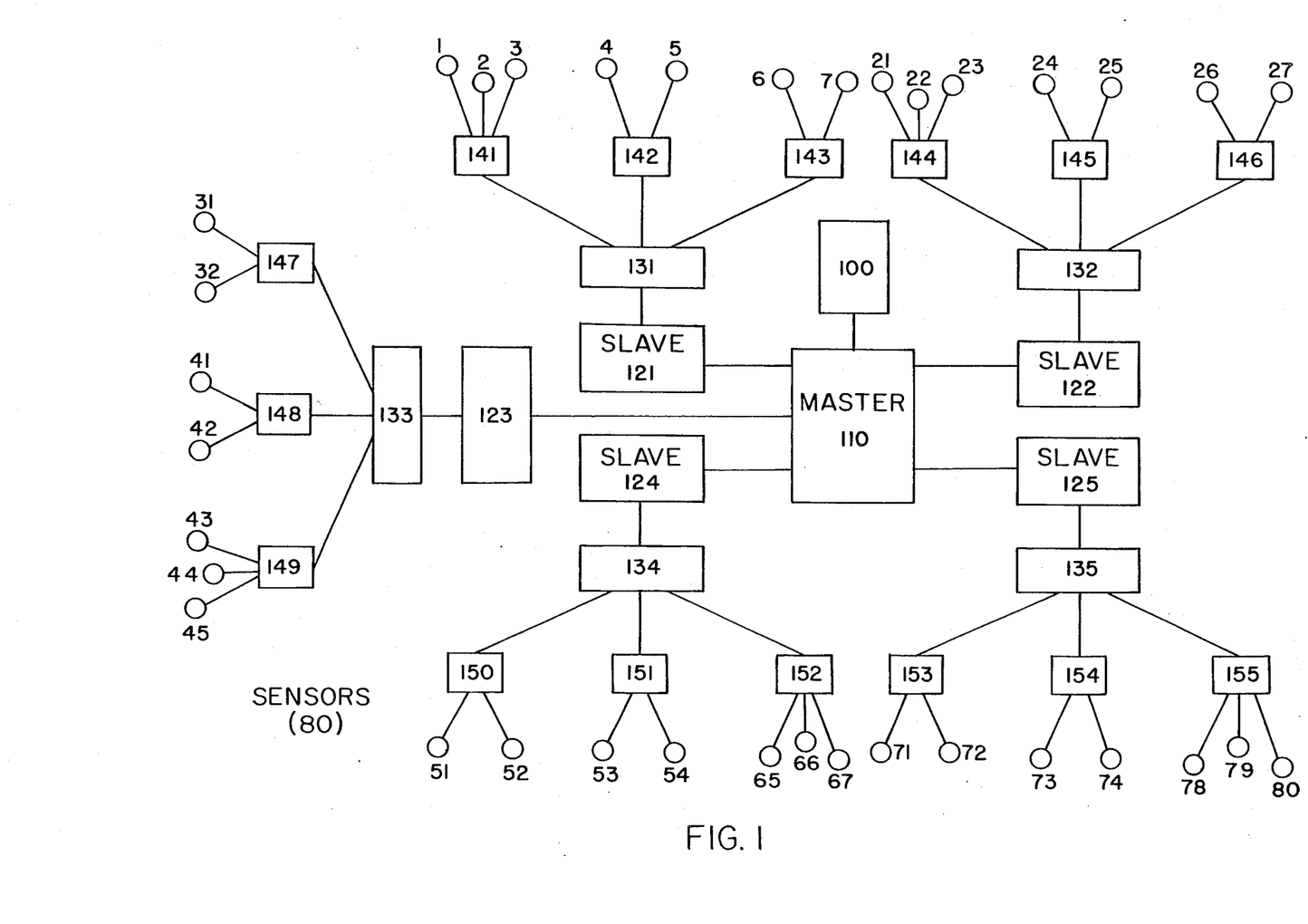
FIG. 1 is a block diagram of the present invention.

The present invention is a seismo-acoustic stealth aircraft detection system. The reader's attention is now directed towards FIG. 1, which is a block diagram of an embodiment of the present invention. The seismo-acoustic detection system of FIG. 1 is a distributed computer network capable of detecting stealth aircraft using: a central data computer 100, a master computer 110, five slave computers 121-125, five subarray circuits 131-135, fifteen junction circuits 141-155, and eighty sensors 1-80. The sensors 1-80 include geophones and microphones which are capable of detecting the seismic and acoustic signatures of stealth aircraft. More specifically, 4 different types of sensors are used: absolute, gage and differential pressure sensors, and seismometers.

All of the sensors except the seismometers don't require any extra gain for their detected signals to reach the junction boxes. For a further description of the use of an individual geophone and microphone as a sensor, see the above-cited Fogler reference. Note that Fogler discloses the use of a single microphone, as an acoustic sensor, and single geophone, as a seismic sensor, to detect the presence of aircraft. The present invention uses several subarrays (each with three or more sensors) to detect and track aircraft Detection is accomplished when the sensors produce output signals which indicate the presence of seismic and acoustic aircraft signatures, as accomplished by the system of the Fogler reference. Tracking is accomplished as follows. Each subarray includes multiple sensors which are placed in a regular distribution over a particular geographic area. As the sensors in each individual subarray produce output signals, the pattern formed over the geographical distribution of activated sensors indicates a direction that the aircraft signature is travelling with respect to the sensors in the subarray. The direction of the aircraft signature indicates the bearing of the aircraft with respect to the subarray. In this fashion each subarray not only detects aircraft, but outputs an aircraft azimuth with respect to the subarray.

The entire system is a network of multiple subarrays which forms an array. The master computer receives both the sensor detection signals and multiple subarray-to-aircraft azimuths. Triangulation of at least three subarray-to-aircraft azimuths will give an aircraft's location. As measurements are taken over a period of time, the aircraft's velocity becomes apparent.

Each of the junction circuits 141-155 electrically connects a number of the sensors 1-80, and relays detected signals to one of the subarray circuits 131-135. While the detection system uses both geophones and microphones as sensors, each subarray is composed exclusively of either seismic sensors or acoustic sensors. The junction circuits 141-155 also supply each sensor with five volts of electrical power, and serve as an interface between the sensors and the subarray circuits, as discussed below.

Each junction circuit outputs detected aircraft signatures to one of the subarray circuits 131-135. Each subarray circuit electrically connects the sensors of three junction circuits into a subarray, and forwards the detected aircraft signatures to one of the slave computers. Each junction circuit may have seismic and acoustic sensors, electrically part of separate subarrays but physically co-located. The subarray circuits (131-135) connect these together to form the subarrays.

The slave computers 121-125 are commercially-available microprocessors which perform two roles. (1) intelligent data acquisition systems; and (2) communication links back to the master. The brain of each slave is a Digital Equipment Corporation LSI 11/23 microprocessor. It manages four distinct information flows through the slave.

(1) Commands generated from within the slave, directed to the analog-to-digital converter (ADC), the analog filters, or the various components in the slave's sensor tree;

(2) Command and status messages between the slave and the master. These could be relayed by both, i.e., the operator at the master might change the gain of one channel;

(3) Data from the slave's ADC into the slave's memory.

(4) Data from the slave's memory back to the master.

The analog characteristics of the slaves are alterable, many changes may be made in software requiring only fractions of a second, and others requiring wires to be jumpered taking possibly several hours. Each slave can handle 16 sensors, and with five laves the system capacity is 80 channels.

The master computer 110 is the heart of the network, and the heart of the master is a Digital Equipment Corporation LSI 11/73 microprocessor.

The master computer 110 has two functions. Primarily, it oversees the network. Its secondary function is to provide access to the system by the operator.

In the course of normal operation, the operator would configure and verify the status of the slaves through the master computer 110. Then the operator, the master, or the slaves independently at some pre-configured set of conditions (time and/or signal output), would start taking data. The slaves would then send data and status back to the master where it would be stored on a 30 Mbyte Winchester disk. This capacity represents approximately 1½ hours of data at the maximum data transfer rate of the network. Data from the disk can be dumped to magnetic tape cartridges, and since these are removable, total system capacity is unlimited. This would require an operator to be present. Simultaneously, data would be made available to the central data computer 100, and a short time later preliminary processed data from the central data computer 100 would be given back to the master computer 110 for display on a text terminal, color graphics terminal, printer or color plotter. Future development includes the identification of specific aircraft by the characteristics of their seismic and acoustic signatures.

The purpose of the central data computer 110 is to process large amounts of data in a short time. Operations such as Fourier transforms, convolution, scaling, and correlation are accomplished.

Figure 2:
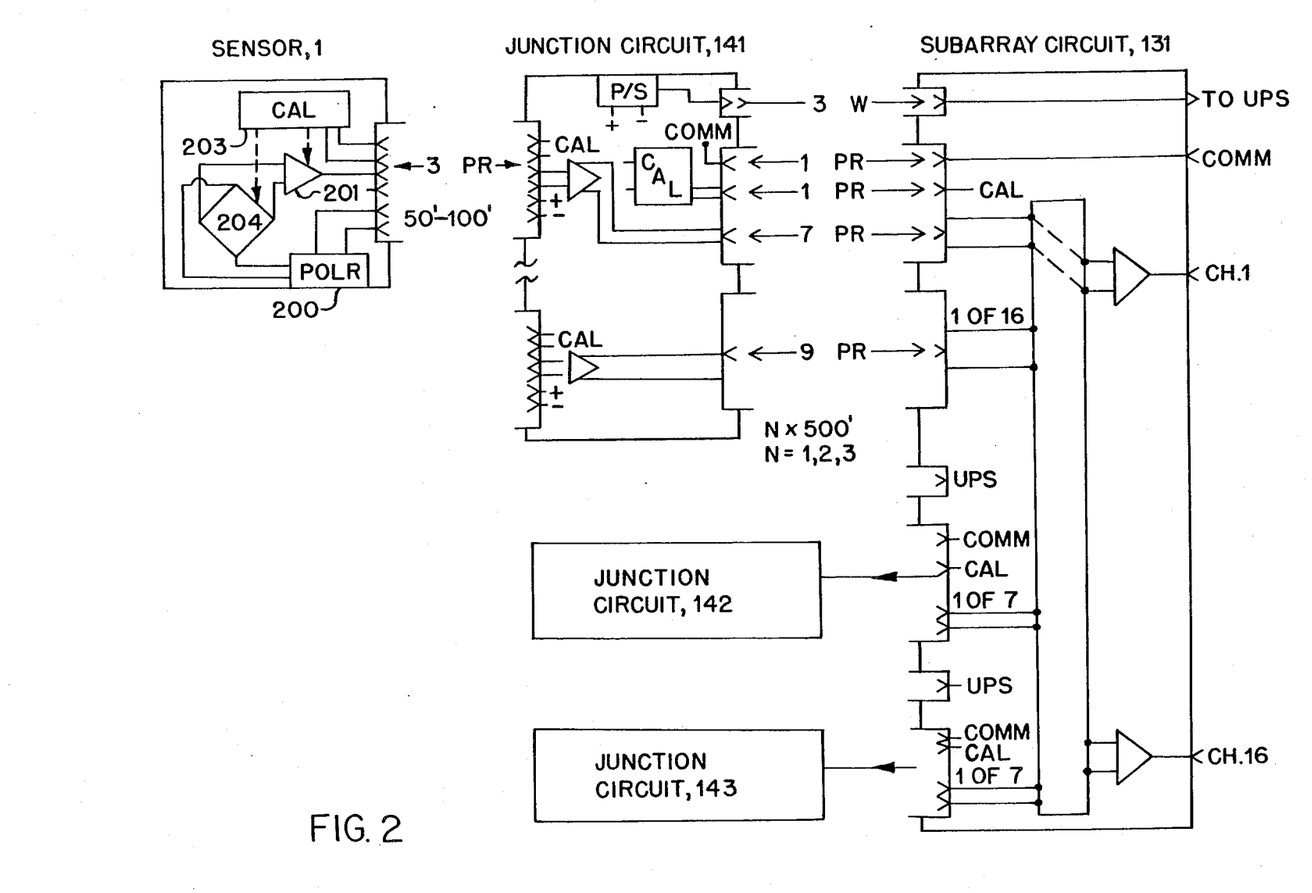
FIG. 2 is an electrical schematic of a sensor, junction circuit, and subarray circuit of the present invention.

FIG. 2 is an electrical schematic of the electrical components and interconnection of: a typical sensor 1, a junction circuit 141, and a subarray circuit 131.

The sensor 1 is one of the 4 different types of commercially-available units including: absolute, gage, and differential pressure sensors, and seismometers. The sensor 1 is electrically connected by three pairs of cables to the junction circuit 141. One pair is used to supply five volts of power from the junction circuit 141 to the sensor 1 through its point-of-load regulator unit (POLR). A second pair of cables forwards detected signals from the sensor amplifier 201 to the junction circuit 141. The sensor amplifier 201 has an adjustable gain which is set by signals from the third pair of cables to the calibration unit.

Each junction circuit 141 is capable of being connected with up to 16 sensors with cable connections as described above. The junction circuit 141 actually supplies 7 volts to the point-of-load unit 200 which adjusts the power supply to 5 volts to a Wheatstone bridge circuit 204 to the sensor 1.

As depicted in FIG. 2, the junction circuit 141 has: an electrical power connection 3 wires (3W) with the subarray circuit; one pair of communication lines (COMM); one pair of lines for receiving calibration signals (CAL); and sixteen pairs of signal cables which relay up to sixteen signature signals from sixteen different sensors to the subarray circuit 131. The pair of communication lines are simply electrical connections providing for the use of a headset to enable people to communicate with maintenance personnel when they visit a junction box 141 or subarray circuit 131.

Figure 3:
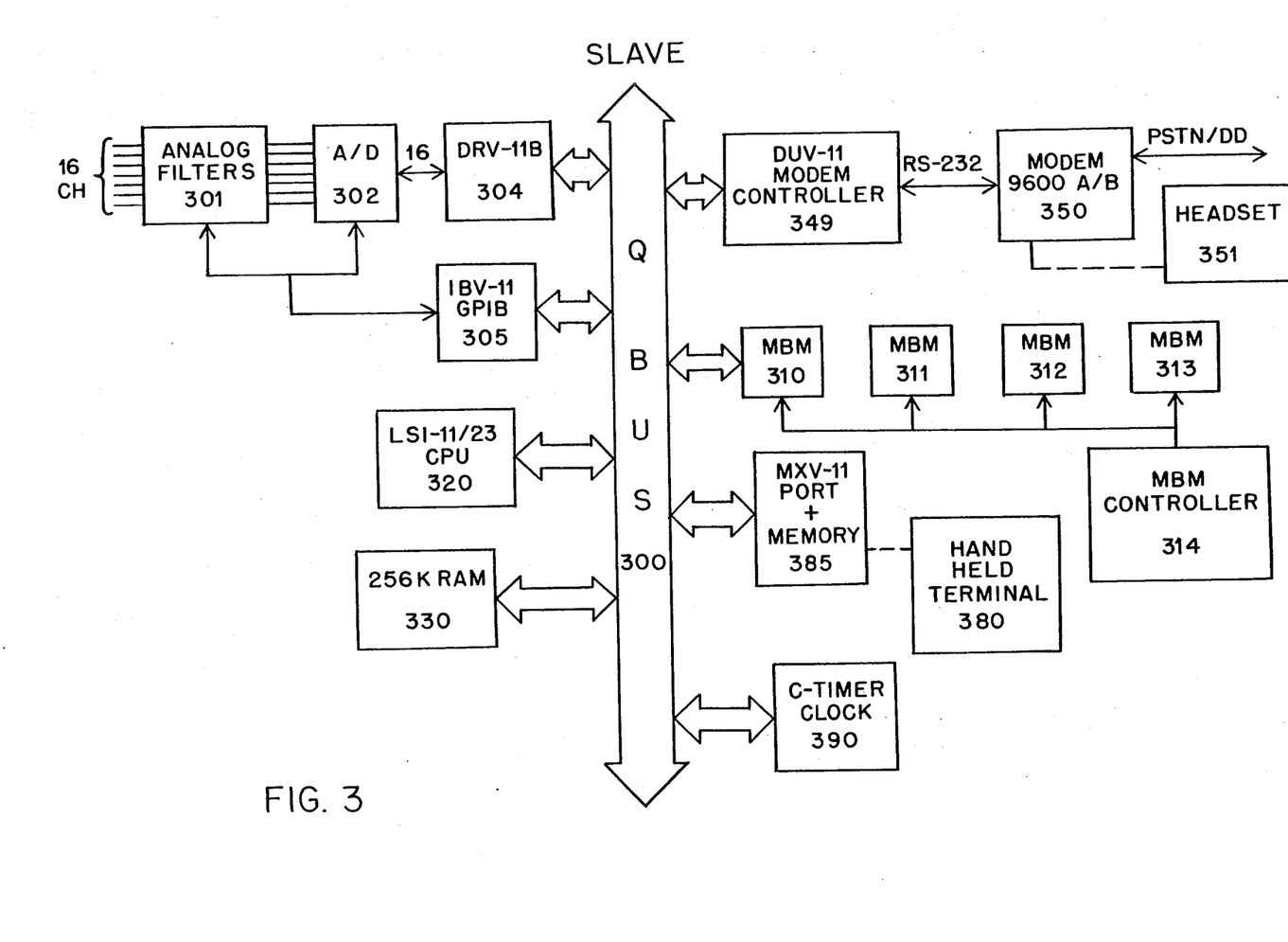
FIG. 3 is a schematic of a slave computer of FIG. 1.

The subarray circuit 131 of FIG. 2 is capable of electrically connecting three junction circuits 141-143 with a slave computer 121. Each slave computer includes a commercially available DEC LSI 11/23 microprocessor. More specifically, FIG. 3 is a schematic representing all of the electrical components which fulfill the functions of a "slave computer". These components are discussed in detail below.

As indicated in FIG. 3, up to 16 channels, which carry detected signals from each subarray circuit, are filtered by a set of analog filters 301. These filters pass the expected seismic and acoustic signals and filter out noise. The Fogler reference suggests that both the seismic and acoustic sensors will detect signals with frequencies ranging from 10 to 200 Hz. When such sensors are used, the analog filters should pass signals between 10 and 200 Hz and filter out all other signals.

Actual acoustic signal characteristics of jet aircraft have been measured and indicate that jet aircraft at a 10 kilometer range will emit an acoustic signature at 50 dB (re 20 uPa) at approximately 125 Hz. Additionally, an air coupled Rayleigh wave is generated with a frequency of about 10 Hz. Therefore, in the present invention, a number of sensors should specifically capture the air coupled wave, and be designed to detect signals from 1.0-10 Hz. These Rayleigh wave signals are much stronger than the seismic signatures of aircraft, and are therefore easier to detect.

After the detected signals are filtered by the analog filters 301, they are converted into digital by an A/D converter 302, and relayed to a data bus 300 by an interface unit 304. The data bus relays the detected signals to the random access memory 330, for temporary storage, to the CPU 320, for processing, and to the magnetic bubble memories 310-313 of the slave computer.

The slave computer, under the direction of the CPU 320 will forward these detected signals out a modem 350 over conventional telephone lines to the master computer. As mentioned above, the slaves perform two roles: (1) intelligent data acquisition, and (2) communication links back to the master. The brain of each slave is a Digital Equipment Corporation LSI 11/23 microprocessor. It manages four distinct information flows through the slave:

commands generated from within the slave, directed to the analog-to-digital converter (ADC), the analog filters, or the various components in the slave's sensor tree; (examples of these signals are discussed below);

command and status messages between the slave and the master, so that the slaves can cooperate, i.e., to help triangulate;

data from the slave's ADC into the slave's memory; and data from the slave's memory back to the master.

The analog characteristics of the slaves are alterable, many changes being made in software requiring only fractions of a second, and others requiring wires to be jumpered taking possibly several hours. Each slave can handle 16 sensors, and with five slaves the system capacity is 80 channels.

If the network crashes, the slaves are capable of performing the data acquisition and storage as previously programmed, independent of outside conditions. Note, however, that local data storage capacity is limited to the capacity of the magnetic bubble memory.

The slaves are also capable of running on battery power for up to 60 minutes. Moreover, alternate power conserving modes of operation during power failure could be directed from the master. In the event of power and network failure, the slave could hibernate until an internal timer signals an upcoming event. A lighter sleep might possibly sample inputs, looking for conditions before becoming fully operational. These options should extend battery powered system life to hours or days.

Crucial to the concept of the slave is its magnetic bubble memory (MBM). Since MBM is non-volatile, data written into it will remain, with or without power, until deliberately erased. Each slave has two Mbytes of MBM on four 0.5 Mbyte cards, with one controller capable of implementing up to sixteen Mbytes of MBM as eight separate emulated disk drives.

With 0.5 Mbytes set aside for the operating system and applications programs, each slave is therefore completely self-contained. Additionally, the 1.5 Mbytes of MBM allocated to data storage will provide a safe buffer in the event that the network crashes, or room for several minutes of data in a "stand-alone" mode if the network is undesirable or impossible to implement.

The exact capacity of the MBM is a function of data bandwidth, data accuracy, and number of channels. The data bandwidth is related to the signal bandwidth by the quality of the anti-aliasing filter. Currently, at each slave, we can store approximately 16 minutes of 30 Hz data at 0.5% accuracy, but only four minutes of 60 Hz data at maximum accuracy.

Use of modular MBM permits flexibility. For example, if less than five slaves are desired, the MBM can be swapped into the remaining slaves thus increasing their capacity. If the entire system is to be expanded, the MBM can be easily increased.

The system of FIG. 3 also provides a port 385 at which a terminal may be connected to relay instructions to either the slave computer, or the master computer. Since the slave computer may be remotely located, with respect to the master computer, a headset 351 may be connected to the modem for communication with people located at the master computer.

The slave computer of FIG. 3 should be provided with 110 VAC, 20 amp electrical power, and a dedicated telephone line with 3 kilohertz capability. As desired above, the system of FIG. 3 simply relays detected signals to the master computer for analysis. However, the system of the present invention is capable of detection, tracking and scanning. Guidelines for programming the slave and master computers for these functions may be derived from the discussion of the tracking function, which is presented below.

Figure 4:
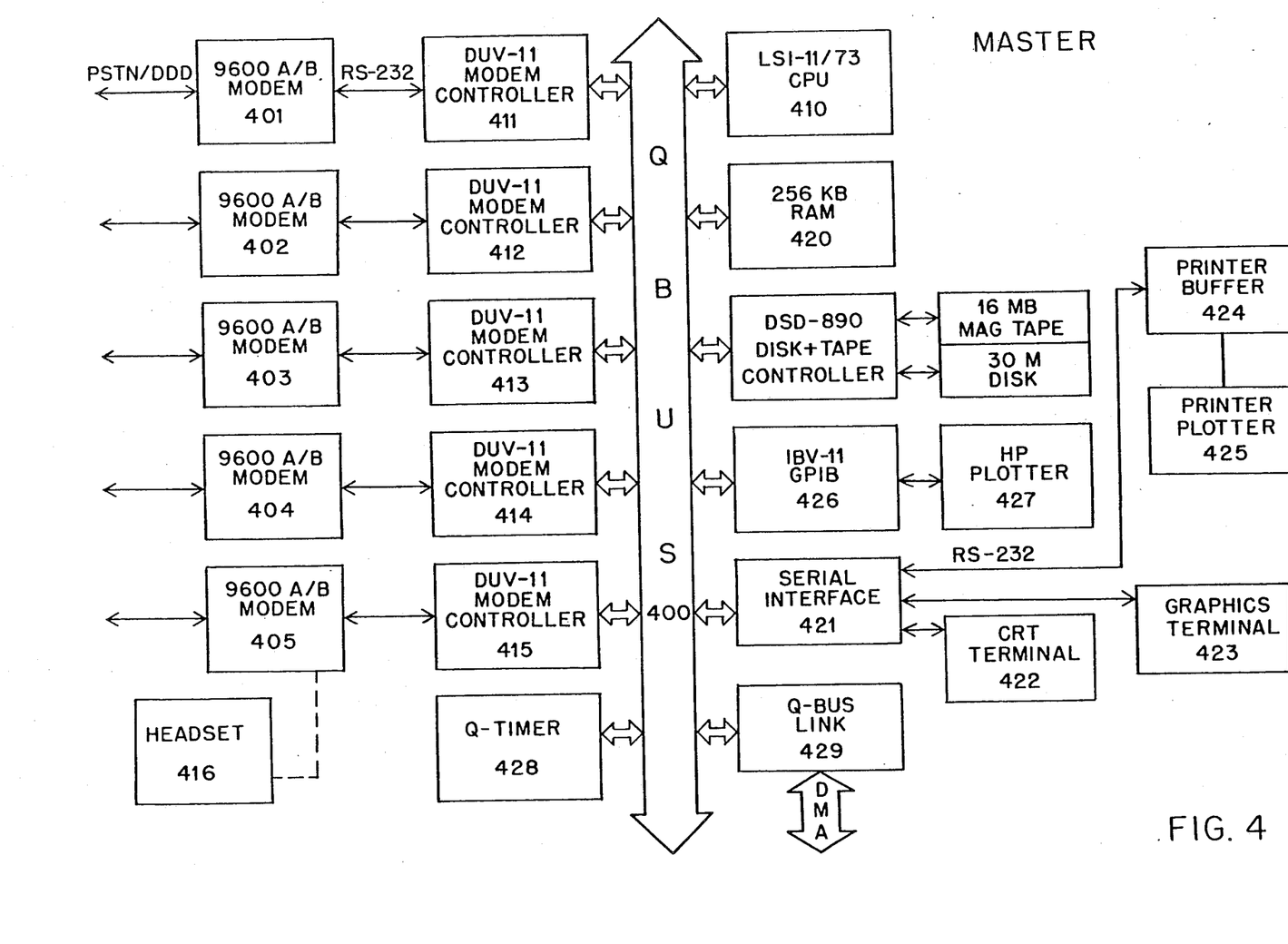
FIG. 4 is a block diagram of a master computer useable in the system of FIG. 1.

FIG. 4 is a block diagram of the master computer of the system of FIG. 1. The master computer uses five 9600 baud modems 401-405 to receive data from each of the five slave computers and relay the data to a data bus 400. As indicated in FIG. 4, a detachable headset 416 may be connected to any of the modems 401-405 to communicate with personnel at the location of a slave computer.

The CPU 410 is a Digital Equipment CorporationLSI 11/73 microprocessor which stores data in a RAM 420, and displays the data to users on a display system 421-427. As mentioned above, the master has two functions. Primarily, it oversees the network. Its secondary function is to provide access to the operator.

In the course of normal operation, the operator would configure and verify the status of the slaves through the master. Then the operator, the master, or the slaves independently at some pre-figured set of conditions (time and/or signal input), would start the Vibro-Acoustic Measurement System (VAMS) taking data. The slaves would then send data and status back to the master where it would be stored on a 30 Mbyte Winchester disk. This capacity represents approximately 1½ hours of data at the maximum data transfer rate of the network. Data from the disk can be dumped to magnetic tape cartridges, and since these are removable, total sysem capacity is unlimited. This would require an operator to be present. Simultaneously, data is available for display on a text terminal 422, color graphics terminal 423, printer 425, and color plotter 427. The central data computer 100 is an optional piece of equipment that can have a number of functions. In current use, it is used to help with the various display systems. Future use of the central data computer will include the identification of aircraft by the characteristics of their seismic and acoustic signatures.

Figure 5A:
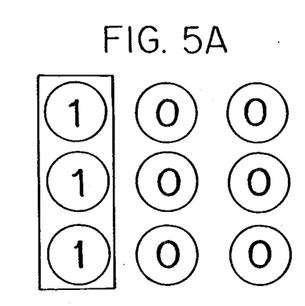
FIGS. 5A-5C are illustrations of a square subarray of 9 sensors as they detect a Rayleigh wave moving across them.
Figure 5B:
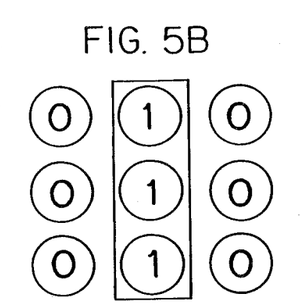
Figure 5C:
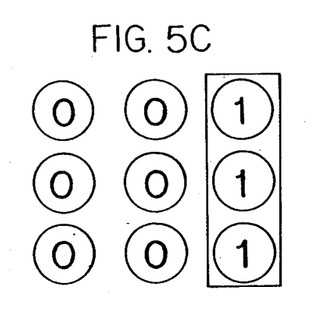

FIGS. 5A-5C are illustrations of a square subarray of 9 sensors which are detecting a Rayleigh wave or pressure wave as it moves from left to right at a velocity of the sensor spacing distance per 1 time tick. FIG. 5A indicates at T=1, all of the sensors in column 1 are outputting a logic "1" detection signal while the sensors of columns 2 and 3 output a logic "0", which indicates that they detect nothing. A typical horizontal and vertical spacing between sensors may be on the order of 500 feet so that a Rayleigh wave travelling from left to right might produce the indications of FIG. 5A at T=1.

FIG. 5B is meant to illustrate the effect of the Rayleigh wave at T=2, as it leaves column 1 and reaches column 2. Similarly FIG. 5C illustrates the Rayleigh wave has reached column 3.

FIGS. 5A-5C are intended to represent simplified examples of the use of a subarray to track aircraft by its seismic and acoustic signature. The Rayleigh or pressure wave may be tracked from right to left; from top to bottom, and bottom to top. The advantage of the array over the system of the Fogler reference is as follows. The seismic and acoustic detection system of Fogler is only capable of indicating the presence or absence of low-flying aircraft by their seismic and acoustic signatures. The simplified array of FIGS. 5A-5C indicates the presence of aircraft as well as the direction their signatures are travelling. The actual tracking of aircraft by such arrays is discussed in further detail below.

Each subarray includes multiple sensors which are placed in a regular distribution over a particular geographic area. As the sensors in each individual subarray produce output signals, the pattern formed over the geographical distribution of activated sensors indicates a direction that the aircraft signature is travelling with respect to the sensors in the subarray. The direction of the aircraft signature indicates the bearing of the aircraft with respect to the subarray. In this fashion each subarray not only detects aircraft, but outputs an aircraft azimuth with respect to the subarray.

The entire system is a network of multiple subarrays which forms an array. The master computer receives both the sensor detection signals and multiple subarray-to-aircraft azimuths. Triangulation of at least three subarray-to-aircraft azimuths will give an aircraft's location. As measurements are taken over a period of time, the aircraft's velocity becomes apparent (along with the aircraft's range and bearing.)

Note that FIGS. 5A-5C are only meant as simplified examples of the use of a subarray of seismic and acoustic sensors. The array is used to scan in certain directions by the application of different delay and weighted sum strategies. An example of one such strategy is presented in the example of FIGS. 6A-6C.

Figure 6A:
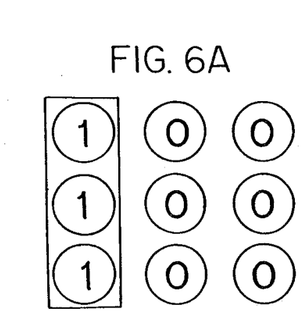
FIGS. 6A-6C are illustrations of a square subarray with its output signal controlled by a delay and weighted sum as it responds to the wave in FIGS. 5A-C.
Figure 6B:
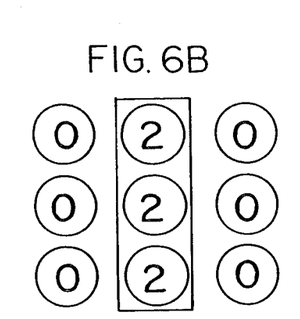
Figure 6C:
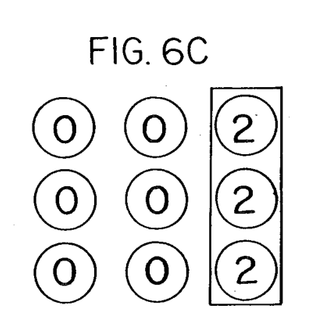

As mentioned in the discussion of FIG. 2, each of the sensors has an adjustable gain which may be controlled by the slave computers. The delay and weighted sum strategy of FIGS. 6A-6C is as follows. When a signal is detected at T=1, the gain of the sensors on the right of any sensor which outputs a detection signal is given a gain of 2× at a delay of T+1. The result is an enhanced sensitivity of subsequent sensors on the right after a Rayleigh wave is initially detected by sensors on the left.

In another delay and weighted sum strategy, the sensors to the right of those outputting a detection signal are given a gain of 2× at delay T+1; while sensors to the left are given a gain of ½. This gain strategy enhances the detection of a wave moving from left-to-right across the array of sensors. When the delay and weighted gain strategy described above is applied, the array is "looking to the left" or "scanning to the left". Similarly, the array can scan to the right or in any direction in much the same fashion that a phased array radar system can scan in all directions.

In view of the foregoing discussion it is apparent that with more sensors forming the array, the more detail of the direction of aircraft signatures is produced on an eighty sensor array, the delay and weighted sum scan can become a circular sweep which progresses in 6 degree increments at each delay time T+1. With the advent of large arrays, the sweep pattern is not limited to the simple 90 degree examples of FIGS. 5A–5C and 6A–6C. Similarly, the actual path of the Rayleigh wave of the aircraft signature may be tracked as it progresses across the array.

While the invention has been described in its presently preferred embodiment it is understood that the words which have been used are words of description rather than words of limitation and that changes made within the purview of the appended claims may be made without departing from the scope and spirit of the invention in its broader aspects.

What is claimed is.

1. A detection system for detecting aircraft comprising:

an array of sensors which senses seismic and acoustic signals generated by said aircraft, said array outputting therefrom detection signals, wherein said array includes a plurality of subarrays of seismic and acoustic sensors which are in a regular distribution over a geographic area of terrain;

a plurality of junction circuits, each of which is electrically connected to sensors which are adjacent to each other in said regular distribution, said junction circuits receiving and amplifying said detection signals to output amplified detection signals;

a plurality of subarray circuits, each of which is electrically connected to some of the junction circuits whose sensors are adjacent to each other in said regular distribution and collecting and relaying said amplified detection signals produced by said junction circuits, said subarray circuits thereby uniting adjacent sensors into a distinct subarray associated with a particular geographic location within said geographic area;

a plurality of slave computers, each of which receives and forwards said amplified detection signals from one of the plurality of subarray circuits, and each relaying command signals back through the subarray circuits and junction boxes to its sensors in its distinct subarray, said control signals adjusting amounts of gain applied to detected signals; and a master computer which receives said amplified detection signals from each of said plurality of slave computers, said master computer thereby forming an array by observing all outputs of each of the distinct subarrays to detect and track said aircraft therefrom by monitoring the detected signals received by all of the seismic and acoustic sensors, said master computer further observing a progression of the detected signals as seismic and acoustic signatures of aircraft strike sensors in the array and progress through the regular distribution over the geographic area of the terrain, said master computer thereby determining a direction from which said seismic and acoustic signals are produced with respect to said array to track said aircraft.

2. A detection system, as defined in claim 1 wherein said sensors are selected from a group consisting of: geophones, microphones, absolute pressure sensors, gage pressure sensors, differential pressure sensors, and seismometers.

3. A detector system, as defined in claim 1, wherein said sensors are responsive to air coupled Rayleigh wave aircraft signatures with a frequency of 1.0–10 Hz and pressure waves with frequencies between 10–200 Hz.

4. A deflection system, as defined in claim 1, wherein each of said sensors includes:

a Wheatstone bridge circuit which supplies electrical power to said sensor;

an adjustable amplifier which is electrically connected to said Wheatsone bridge and said sensor, said amplifier providing an adjustable gain to said amplifier providing an adjustable gain to said detection signals so that they are received by one of the plurality of junction circuits, said adjustable amplifier thereby outputting said detection signals to one of the junction circuits;

a point-of-load unit which receives and adjusts electrical power to provide a stable supply of electrical power to said sensor through said Wheatsone bridge circuit; and a means for adjusting the adjustable gain of said adjustable amplifer, said adjusting means receiving said control signals from one of the plurality of junction circuits and adjusting said adjustable gain in response thereto.

5. A detection system, as defined in claim 4, wherein each of said plurality of junction circuits comprises:

a power supply unit which is electrically connected with and supplies said electrical power to the point-of-load units of the sensors which are adjacent to each other in said regular distribution of the sensors over the geographical area;

a plurality of first input lines, each being electrically connected with and receiving the detection signals from the adjustable amplifier of one of the sensors;

a first set of amplifiers, each of which receives and applies a constant gain to the detection signals received from one of the plurality of first input lines, said set of amplifiers thereby outputting said amplified detection signals;

a plurality of first output lines, each of which receives and conducts amplified detection signals from one of the first set of amplifiers to one of the subarray circuits; and a plurality of second input lines which receives and conducts said command signals from one of the subarray circuits to one of the adjusting means of one of the sensors.

6. A detection system, as defined in claim 5, wherein each of said subarray circuits comprise:

a plurality of third input lines, each connecting with and receiving said amplified detection signals from one of the first output lines from some of the plurality of junction circuits whose circuits are adjacent to each other in said regular distribution;

a second set of amplifiers, each receiving and boosting amplified detection signals from one of the plurality of third input lines to compensate for power losses over line transmission;

a plurality of second output lines, each receiving and conducting said amplified detection signals from one of the second set of amplifiers to one of the plurality of slave computers; and a plurality of fourth input lines, each receiving said command signals from one of the slave computers and relaying it to one of the plurality of second input lines to allow the command signals to adjust the gain of each individual sensor.

7. A detection system, as defined in claim 6, wherein said slave computers each comprise:

a first microprocessor which receives digital detection signals and determines therefrom a progression of said Rayleigh and pressure wave aircraft signatures across the sensors in the subarray associated with said slave computer, said microprocessor thereby determining a subarray azimuth which indicates an azimuth to said aircraft with respect to said subarray;

an analog-to-digital converter which receives and processes said amplified detection signals from said second output lines from one of said subarray circuits to output digital detection signals to said first microprocessor;

a first digital bus which relays signals between said analog-to-digital converter and said microprocessor;

a first memory means which receives, stores and outputs said digital detection signals and said subarray azimuth from said first digital bus; and a means for sending said digital detection signals and said subarray azimuth from said first memory to said master computer.

8. A detection system as defined in claim 7, wherein said master computer comprises:

a means for receiving said digital detection signals and said subarray azimuth from each of said slave computers;

a second digital bus which receives and relays said digital detection signals and each subarray azimuth received from said receiving means;

a second microprocessor which receives said digital detection signals and each subarray azimuth from said second digital bus, said second microprocessor detecting a presence of said aircraft by a presence of said digital detection signals, said second microprocessor locating said aircraft, by triangulating each subarray azimuth from the plurality of subarrays, said second microprocessor tracking said aircraft by repeatedly locating the aircraft, following its process as time progresses, and projecting its velocity and location, said second microprocessor thereby outputting signals indicating said aircraft's detection, position and velocity; and a second memory which receives and stores the output signals of the second microprocessor; and a means for displaying the output signals of the second microprocessor.

* * * * *